March 29, 1932.     Z. A. BRUEGGER     1,851,086
PISTON
Filed April 4, 1930
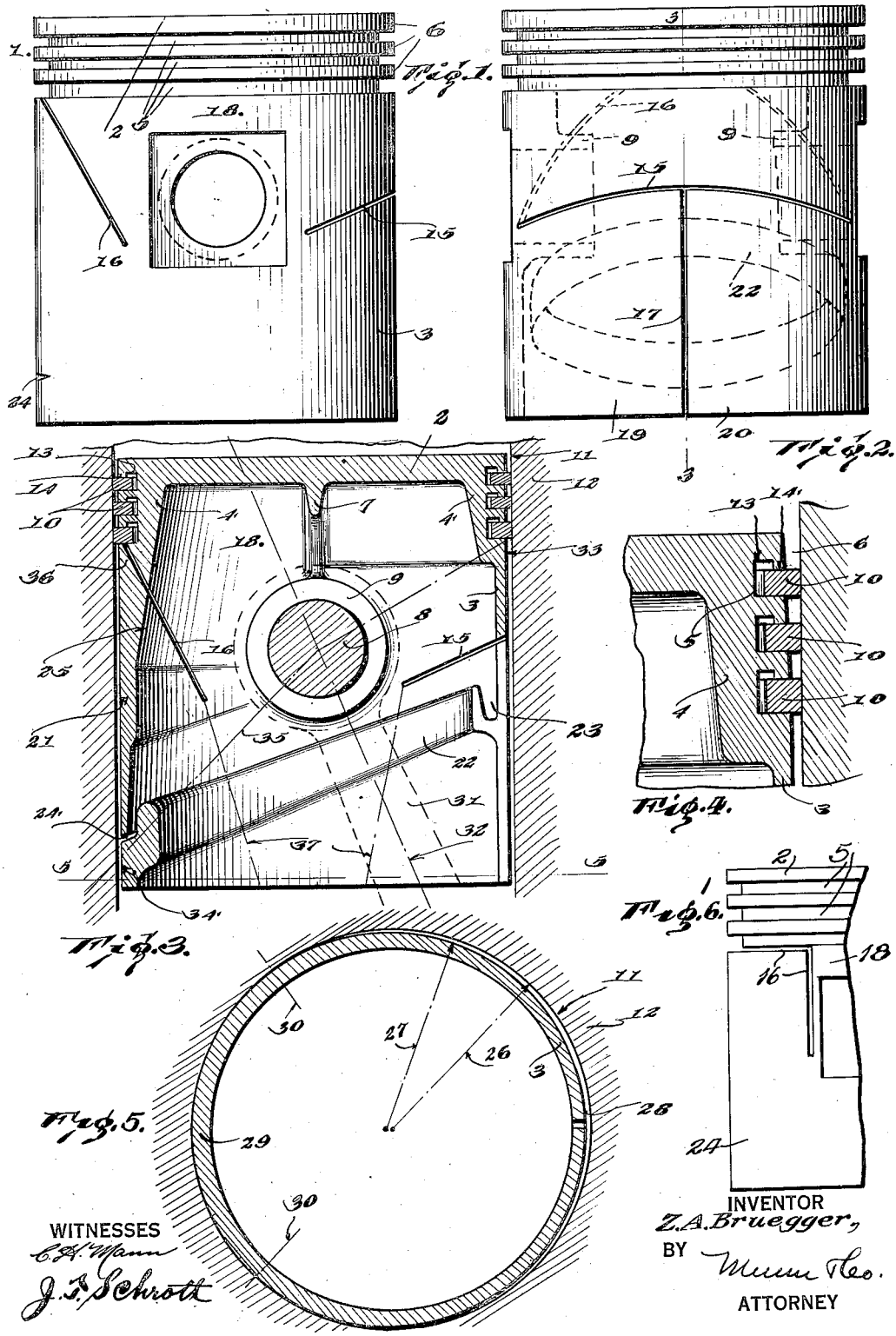

Patented Mar. 29, 1932

1,851,086

UNITED STATES PATENT OFFICE

ZENO ARNO BRUEGGER, OF BOISE, IDAHO

PISTON

Application filed April 4, 1930. Serial No. 441,572.

This invention relates to improvements in pistons, especially of the type used in internal combustion engines although not confined to such use, and it consists of the constructions, combinations and arrangements herein described and claimed.

One of the foremost objects of the invention is to provide a piston having those structural characteristics that will make it possible to utilize the inevitable distortions to which all pistons are subject while in operation to the end of positively overcoming the defects resulting from such distortions.

Another object of the invention, and one depending directly on the foregoing factors, is to tend to keep the piston rings in longitudinal alinement with the cylinder bore.

Another object of the invention is to slot the piston skirt at diametrically opposite sides by means of kerfs which are approximately at right angles to each other, it being the particular position of these kerfs with reference to each other and with the wrist pin that is depended upon for the majority of advantages presently enumerated.

Other objects and advantages will appear in the following specification, reference being had to the accompanying drawings in which Figure 1 is a front elevation of the piston, showing it in the position that it would assume in the cylinder bore if viewed from the front of the engine.

Figure 2 is a side elevation of the piston, showing it as it would appear in the cylinder bore if viewed from the right of the engine.

Figure 3 is a vertical section agreeing with the position of the piston in Figure 1, a portion of the cylinder being shown in section.

Figure 4 is a detail sectional view more particularly illustrating the recessed or undercut ring lands.

Figure 5 is a diagrammatic cross section as though taken on the line 5—5 of Figure 3, particularly showing the eccentric construction of the piston skirt to provide an enlarged contacting area on what is herein known as the major thrust side of the piston.

Figure 6 is a detail view of a portion of the piston illustrating another one of the types of kerfs herein described.

In addition to this invention being an improvement on pistons in general it is a particular improvement on the engine pistons of Zeno Arno Bruegger, disclosed in Patent 1,395,794 of November 1, 1921, and 1,492,917 of May 6, 1924. Each of these patents discloses an oil channel, capable of incorporation in the skirt of the piston in any one of a variety of ways, for the purpose of insuring the lubrication of the major thrust side of the piston as well as to serve as a reinforcement for the piston skirt.

That oil channel occurs in the instant piston, and although it serves the same purposes already assigned to it, yet it is now made to play the important part of an element in a new combination which has certain beneficial effects to be brought out. In order to do this the plan of this description is to first explain the structure of the piston, then enumerate the various advantages by way of comparison with the action of known pistons.

The improved piston generally designated 1 comprises a head 2 with a skirt 3 which in its upper region is enlarged at 4 to provide adequate material in which to cut the ring grooves 5 and thus provide a series of flanges which are herein known as ring lands 6. This enlargement has a reinforcing rib 7 which extends in the general direction of the wrist pin 8 and by virtue of this fact merges with the bosses 9 (Fig. 2) in which the ends of the wrist pin are secured or journaled. The rib 7 acts as a drip edge as later appears.

Each of the grooves 5 contains a resilient ring 10 the outer surface of which bears against the wall or bore 11 of the cylinder 12 in the well known manner. Each of the grooves 5 is annularly recessed or undercut at 13 for the purpose of restricting the adjacent bearing edge 14 of the land 6 to a greatly diminished area. This makes a far better oil seal than if the entire surface of the groove were permitted to contact the adjacent side of the ring.

In the drawings the annular recesses 13 are shown in the top of the grooves 5. In practice it may be found desirable to produce these recesses in the bottom of the grooves. It may even be desirable to have the recesses 13 both in the top and bottom. The purpose of these statements is to anticipate the desirable variations in the location of the recesses.

Kerfs 15 and 16, the former having a communicating longitudinal kerf 17 (Fig. 2), or cut in the skirt 3 provide slots which divide the piston 1 as follows:—an upper laterally expansible portion generally denoted 18, a pair of leaves 19, 20 (Fig. 2) on the right side of the piston and a part 21 at the left side herein known as a contacting shoe. The kerfs 15, 16 are cut approximately at right angles to each other, but not necessarily so. Variations in the angular relationship of the kerfs are permissible without affecting the action of the regions just described in the least.

For example, instead of using the left bottom corner of the lowest groove 5 as the starting point for the kerf 16 it may be found in practice that the machining operation would be facilitated by cutting straight into the enlargement 4 from the ring groove and then down into the skirt 3. As a matter of fact the particular position of the kerf 16 is advantageous to the extent that the corner of the lowest groove can be used as a starting point for the saw or other cutting implement. The blade is thus kept in position and will make a cleaner cut.

Another example would be the starting of the kerf 16 in the side of the skirt 3 below the bottom groove. This may be necessitated by different designs of pistons. But the preferred starting point of the kerf 16 is in the bottom groove, and regardless of whether the kerf is started on the angle shown or is cut in radially then downwardly to the skirt the lowermost ring 10 will have the important advantage of sealing the upper end of the kerf. It is highly desirable to utilize the oil for the lubrication of the piston but it is an express purpose of the invention to prevent its getting on top of the piston.

An upstanding flange 22 defines an oil channel 23 around the inside of the skirt 3. This channel is circular but is located on a bias (Fig. 3). It may be made integrally with the skirt as shown or separate for attachment or detachment. The high end of the channel at the right side of the piston communicates with the longitudinal kerf 17 inasmuch as this is sawed directly through the flange 22. The low side of the channel has an oil outlet 24 at the lower left side of the piston to lubricate the adjoining surface of the bore 11 which receives the major thrust of the piston.

Reverting to the contacting shoe 21 it is to be observed that the inner wall has a taper 25 which merges the enlargement 4 with the piston skirt 3 at the region adjoining the low end of the channel 23. The purpose of this taper in the inner wall is to convert it into an oil deflector. Oil pocketed in the bottom of the channel 23 which, evidently is deep enough to retain a considerable volume of oil, when the motor is at rest, will, by virtue of its inertia on an outward stroke of the piston, be in effect thrown up against the taper 25, thence deflected away from the kerf 16 and toward the rib 7. This rib then becomes a drip edge from which the wrist pin journals are lubricated.

Attention is directed to Figure 5. This is a diagrammatic view particularly intended to illustrate the eccentric construction of the piston. The cylinder bore 11 is struck on a radius 26 while the external surface of the piston is struck on a radius 27. The centers of these radii are offset a distance of .004 more or less thus producing an apparent crescent-shaped space 28 which diminishes toward the left portion 29 of greatest thickness of the skirt.

The result of the eccentric construction of the piston is to produce an increased area of contact on the major thrust side of the piston which is approximately defined between the points 30 and is coextensive with the length of the piston.

It is now proposed to separately enumerate the various advantages of the improved piston brought about by the foregoing constructions and at the same time emphasize them by comparison with a piston of the commonly known type.

First assume the piston 1 to be moving outwardly of the cylinder 12 (Fig. 3) by force of an explosion. One of the positions of the connecting rod 31 will be as shown in dotted lines (Fig. 3) which may be regarded as agreeing with the crank at 90° past the top dead center. The line 32 of the crank shaft resistance will be traced along the major axis of the connecting rod 31 and will intersect the major axis of the wrist pin 8.

According to a practical resolution of the forces involved the top of the piston will tend to tilt to the right at 33 while the bottom will tilt to the left at 34, this by virtue of a distorted power line 35. Under this circumstance the major thrust of the conventional piston against the bore 11 will occur at 34 and is confined to a relatively small area.

According to the improved piston this limited thrust area is avoided in the following manner:—When the foregoing pressure occurs at the point 34 there will be a tendency of the part or side 21 to bend toward the left so that the high point 36 of the side moves outward into contact with the bore 11. By virtue of this function of the side the latter is herein known as the contact shoe because through its instrumentality the contact surface of the piston is distributed over a wide area, tending to keep the piston erect and particularly avoiding wearing into the adjacent side of the bore.

Another factor in the extended contact area of the shoe 21 is the thickened formation of the piston skirt 3 between the points 30 (Fig. 5). In addition to extending the bearing area longitudinally of the piston which is the function of the shoe 21 by virtue of its bending, the bearing area is also extended circumferentially by virtue of the thickening of the skirt between the points 30 as already stated.

But the tendency to keep the piston alined with the bore 11 is not solely a function of the contact shoe 21. The leaves 19, 20 (Fig. 2) will spread laterally under the force of the power strokes. The spreading occurs in the direction of the right side of the bore 11 and when the latter is contacted by the leaves the effect of them together with that of the shoe 21 is to tend to keep the piston in an upright position.

These bending effects of the shoe 21 and leaves 19, 20 rely upon the kerfs 16, 15. These, it will be observed (Fig. 3) are directed well toward the nether sides of the bosses 9. The foregoing bending of the skirt 3 will thus be confined to areas surrounding approximate lines 37 and will not extend above the kerfs 15, 16 to throw the bosses 9 out of line.

Second. There are known types of pistons in which kerfs at the right or left side are so located in reference to the wrist pin bosses that these are distorted and thrown out of line by the power impulses. In instances where the wrist pin is journaled in the bosses it follows that tremendous friction is set up to the ultimate end of damaging wear both on the wrist pin ends and the bosses. This is especially true of types wherein a substantially longitudinal kerf communicates with a radial kerf located well above the bosses.

Mention has been made of the upper portion 18 of the piston 1 being capable of lateral expansion. In practice the right side of the skirt 3 at the place between the kerf 15 and lowermost slot 5 will rest against the bore 11. Of necessity the expansion must occur toward the left toward the top of the shoe 21 where it is held in suspension by the spring action of shoe 21. The shoe is therefore a resilient abutment for the left side of the portions 18 and by virtue of its action tends to hold the portion 18 square against the cylinder wall at the place later identified as 33, preventing the usual ring dig.

Third. The ultimate result of the manner in which the piston parts are forced to expand is to avoid piston slap. The right and left sides will not be permitted to wear the bore into the commonly known "egg" shape. Another effect is to equalize the opposite side pressure of the piston against the bore 11.

Hence when the piston tends to tilt to the right by force of the explosion the top ring 10 will be prevented from gouging into the right surface of the bore 11 and accentuating the passage through which oil can be dashed to the top of the head 2.

This dashing of the oil is a common defect and the appearance of oil on top of the head 2 will be noted whether or not the right side of the bore 11 is gouged or scored. The reason for the passage of oil to the top of the head 2 in conventionally known pistons is as follows:—Large quantities of oil spray are thrown diagonally across the cylinders upon the upstroke of each crank. The bottom of all of the cylinders will be filled with oil spray moving in a generally upward and right direction. It follows that the space at the right of a tilted piston moving down by force of an explosion will constitute but an enlarged conduit through which this spray will be conducted to the top of the head 2.

By making it possible for the right side of the skirt 3 to expand into abutment with the bore 11 in the region 33 (Fig. 3) it follows that oil spray thus dashed upwardly will not be able to pass. On the contrary the upper edges of the expanded leaves 19, 20 will scrape this oil off so that it flows through the kerf 15 into the channel 22. In conventionally known pistons it is impossible to prevent the accumulation of large amounts of carbon but in the instant piston the foregoing preventive measure for keeping the oil from passing to the top of the head 2 will practically eliminate the formation of carbon.

Fourth. Although the channel 23 has a bottom outlet 24 a considerable quantity of oil will remain pocketed at the lower end and held there by the expanding action of the leaves 19, 20 while the motor is still. Upon starting the motor the inertia of the oil will in effect fly up and out of the bottom of the channel. Were it not for the taper 25 some of this oil might work upwardly through the kerf 16 into the bottom ring groove thence out to the top of the head 2. But the taper 25 constitutes a deflector which partly keeps the oil away from the kerf 16 and throws it over to the left side of the rib 7.

From here the oil drips to continuously lubricate the wrist pin journals. While this function is especially active while the oil is warm it is no less effective when starting a cold motor. Ordinarily when a motor has stood over night or for other long periods the previously warmed oil will all have run off of the piston surfaces and these will be totally devoid of lubrication by the time the operator is ready to start again. However, by utilizing the bottom of the channel 23 as a reservoir there will be available an immediate supply of oil to be spread over the left side of the bore 11 in the region of the major thrust side by virtue of its flowing out of the outlet 24.

Consider again the starting of the motor on a cold morning. Since the piston is contracted to its smallest dimension it follows that the maximum tilt will occur by force of an explosion. The result is an extension of the rings at the left so that gasoline is not only scraped off of the bore 11 to wash down between the piston and bore at the left side but also to enter through the holes behind the bottom ring in case this is an oil ring. This defect is prevented in the instant piston because of the tendency of the contacting areas of the skirt with the bore at 33, 34 to prevent tilting of the piston.

From these illustrations it must be apparent that there is one feature that dominates the piston, namely the fixed areas 33, 34 at diagonally opposite points of the skirt. The area 34 is regarded as fixed because it is this that is driven against the left side of the bore 11 by force of an explosion. The area 33 is fixed for the same reason. This diagonally opposite contact of the areas 33, 34 with the bore 11 again occur only by the tilting of the piston but the thing sought to be emphasized herein is that the inevitable tilting of the piston enables the expansible parts thereof to perform those functions which will prevent the occurrence of the enumerated defects in conventional pistons.

The necessity of strengthening the area 34 is so urgent that the flange 22 is employed as a reinforcing strut in addition to serving its function as an oil channel. It is observed in Figure 3 that the lower end of the flange 22 is considerably heavier than the upper end. While the biased disposition of the channel 23 is adapted particularly well to the collection and storing of oil, yet it also braces the piston skirt in the general direction of the high pressure points at the regions 33, 34.

The purpose of the annular recesses 13 (Fig. 4) is to be emphasized. The natural action of piston rings is to set up a pumping action by virtue of compressing and expanding in conformity with the tilting of the piston during operation. It has been found that by cutting recesses 13 and thus restricting the bearing edge 14 to a relatively narrow circular area the seal between the ring and the adjacent land 6 is greatly improved so that oil is not so likely to be pumped past. This constricted bearing area also constitutes a scraping edge which keeps the adjacent side of the ring clear of carbon. While it is true that some of this scraped carbon will collect in the grooves 5 and recesses 13 in back of the rings, yet the intended tight fit of the piston brought about by virtue of its structural features will prevent any noticeable escape of oil up past the rings so that very little carbon will be formed in the first place.

In known types of pistons it is a common occurrence for noticeable wear to occur both on the top land 6 and top ring 10. This is due to the unrestricted tilting of the piston first to one side then to the other in agreement with the strokes of the connecting rod. This tilting is accentuated as the use of the motor continues, hence the necessity of replacing the rings and sometimes the pistons. This wear on both the top ring and top land is prevented in the instant piston by virtue of keeping the latter as nearly erect in the bore 11 as is possible.

While the construction and arrangement of the improved piston is that of a generally preferred form, obviously modifications and changes may be made without departing from the spirit of the invention or the scope of the claims.

I claim:—

1. A piston provided with bosses, ring grooves and a skirt, the said piston having an oil channel on the inner surface thereof, a slot cut in the lower ring groove and an additional slot extending downwardly from each end of the ring groove slot adjacent to the bosses, and an aperture at the lower portion of the skirt between said downwardly extended slots opening into said channel, the skirt on the opposite side of the piston being provided with a T-shaped slot, the upper end of the T extending between and adjacent to the lower portions of the bosses and the lower end of the T terminating at the lower edge of the skirt, all of said slots extending entirely through the walls of the piston.

2. A piston provided with bosses, ring grooves and a skirt, the said piston having a slot cut in the lower ring groove and an additional slot extending downwardly from each end of the ring groove slot adjacent to the bosses, the skirt on the opposite side of the piston being provided with a T-shaped slot, the upper end of the T extending between and adjacent the lower portions of the bosses and the lower end of the T terminating at the lower edge of the skirt, all of said slots extending entirely through the walls of the piston.

3. A piston having a head and trunk, the trunk being substantially cylindrical and having one segmental portion of its sides opposite the wrist pin axis on a slightly lesser degree of curvature than the remaining portion of said sides, the outer surface of said remaining portion being of approximately the same radius of curvature as the interior of the cylinder in connection with which the piston is designed to be used, said trunk having a kerf extending from the lower ring groove into said remaining portion to provide a bendable contact shoe.

ZENO ARNO BRUEGGER.